United States Patent
Han et al.

(10) Patent No.: US 9,045,020 B2
(45) Date of Patent: Jun. 2, 2015

(54) SYSTEM AND METHOD FOR REDUCING A BUFFETING CONDITION IN A PASSENGER COMPARTMENT OF A VEHICLE

(75) Inventors: Taeyoung Han, Bloomfield Hills, MI (US); Bahram Khalighi, Troy, MI (US); Kuo-Huey Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 774 days.

(21) Appl. No.: 13/220,368

(22) Filed: Aug. 29, 2011

(65) Prior Publication Data
US 2013/0054096 A1 Feb. 28, 2013

(51) Int. Cl.
*B60H 1/26* (2006.01)
*B60H 1/00* (2006.01)

(52) U.S. Cl.
CPC ............ *B60H 1/26* (2013.01); *B60H 2001/006* (2013.01)

(58) Field of Classification Search
USPC ........................................................... 701/49
See application file for complete search history.

(56) References Cited

U.S. PATENT DOCUMENTS

| 5,045,765 A | * | 9/1991 | Wissler | 318/382 |
| 2010/0243083 A1 | * | 9/2010 | Shereyk et al. | 137/527 |

FOREIGN PATENT DOCUMENTS

| CN | 201737057 U | 2/2011 | | |
| CN | 102009581 A | 4/2011 | | |
| CN | 102963444 A | 3/2013 | | |
| DE | 3922941 A1 | 1/1991 | | |
| DE | 19633188 C1 | * | 7/1997 | ............ E05F 15/20 |
| DE | 10340979 A1 | * | 3/2004 | ............ B60J 7/057 |
| DE | 112008002753 T5 | 8/2010 | | |
| DE | 102012212567 A1 | 2/2013 | | |
| JP | S59150317 A | 8/1984 | | |
| JP | 781381 A | 3/1995 | | |
| JP | 07081381 | * | 8/1995 | |
| JP | 2010229620 A | * | 10/2010 | |
| JP | 2011121537 A | 6/2011 | | |
| KR | 1020110048665 A | 5/2011 | | |

OTHER PUBLICATIONS

German Patent and Trade Mark Office, Office Action for German Patent Appliction No. 10 2012 212 567.1, mailed Feb. 27, 2014.
State Intellectual Property Office of the Peoples' Republic of China, Office Action for Chinese Patent Application No. 201210311784.0, mailed Aug. 22, 2014.

* cited by examiner

*Primary Examiner* — Shelley Chen
(74) *Attorney, Agent, or Firm* — Ingrassia Fisher & Lorenz, P.C.

(57) ABSTRACT

A system and method for reducing a buffeting condition in a passenger compartment of a vehicle is disclosed herein. The system includes, but is not limited to, a blocking member disposed between the passenger compartment and an adjacent space that is configured to move between an open position and a closed position to respectively open and close an opening between the passenger compartment and the adjacent space. The system further includes a motor operatively coupled with the blocking member and configured to move the blocking member between the open position and the closed position. The system still further includes a controller operatively coupled to the motor and configured to control the motor to move the blocking member to alternate between the open position and the closed position at a predetermined rate in response to a triggering event, whereby a buffeting condition experienced in the passenger compartment is diminished.

20 Claims, 4 Drawing Sheets

SYSTEM AND METHOD FOR REDUCING A BUFFETING CONDITION IN A PASSENGER COMPARTMENT OF A VEHICLE

TECHNICAL FIELD

The technical field generally relates to automobiles, and more particularly relates to a system and method for reducing a buffeting condition in a passenger compartment of a vehicle.

BACKGROUND

On some vehicles, when a sun roof, a moon roof, a window or other opening is opened while the vehicle is being driven, a passenger may observe/experience a buffeting noise/sensation (referred to herein as a "buffeting condition") inside the passenger compartment. The buffeting condition is a naturally occurring phenomenon which results from the coupling of acoustic and hydrodynamic flows inside the passenger compartment that introduce strong pressure oscillations in the passenger compartment in a relatively low frequency (10 to 50 Hz). The origin of the buffeting noise is a shear layer instability that forms in the opening of the passenger compartment as a result of incoming flows. When the shear layer vortices break down, a pressure wave is produced that propagates into the passenger compartment. This low frequency buffeting condition may be undesirable to the occupants of the passenger compartment.

Accordingly, it is desirable to provide a system that permits an occupant of a passenger compartment to open a window or other opening of the passenger compartment without provoking an undesirable buffeting condition. In addition, it is desirable to provide a method for diminishing the strength and/or discernability of the buffeting condition. Furthermore, other desirable features and characteristics will become apparent from the subsequent detailed description and the appended claims, taken in conjunction with the accompanying drawings and the foregoing technical field and background.

SUMMARY

A system and method for reducing a buffeting condition in a passenger compartment of a vehicle are disclosed herein.

In a first non-limiting embodiment, the system includes, but is not limited to, a blocking member that is disposed between the passenger compartment and an adjacent space. The blocking member is configured to move between an open position and a closed position to repeatedly open and close an opening between the passenger compartment and the adjacent space. The system further includes a motor that is operatively coupled with the blocking member and that is configured to move the blocking member between the open position and the closed position. The system still further includes a controller that is operatively coupled to the motor. The controller is configured to control the motor to move the blocking member such that the blocking member alternates between the open position and the closed position at a predetermined rate in response to a triggering event, whereby a buffeting condition experienced in the passenger compartment is diminished.

In another non-limiting embodiment, the system includes, but is not limited to, a blocking member that is disposed between the passenger compartment and a trunk of the vehicle. The blocking member is configured to move between an open position and a closed position to respectively open and close an opening between the passenger compartment and the trunk. The system further includes a motor that is operatively coupled with the blocking member and that is configured to move the blocking member between the open position and the closed position. The system further includes a sensor that is configured to detect the buffeting condition in the passenger compartment of the vehicle and to generate a signal containing information that is indicative of an occurrence of the buffeting condition when the buffeting condition is detected. The system still further includes a controller that is communicatively coupled with the sensor and that is operatively coupled to the motor. The controller is configured to receive the signal from the sensor and to control the motor to move the blocking member such that the blocking member alternates between the open position and the closed position at a predetermined rate when the signal is received, whereby a buffeting condition experienced in the passenger compartment is diminished.

In another non-limiting embodiment, the method includes, but is not limited to the steps of detecting an occurrence of the buffeting condition within the passenger compartment of the vehicle and opening and closing a blocking member disposed between the passenger compartment and an adjacent space at a predetermined rate.

DESCRIPTION OF THE DRAWINGS

One or more embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

One solution that will diminish the intensity of the buffeting condition in a passenger compartment entails oscillating a blocking member to repeatedly open and close an opening that is positioned between the passenger compartment and a space that is adjacent to the passenger compartment (referred to herein as an "adjacent space"). By continuously oscillating the blocking member to open and close the opening, the volume of the passenger compartment continuously changes which will disrupt the buffeting condition. The reason for this is that the buffeting condition corresponds with the resonance frequency of the passenger compartment and the resonance frequency of the passenger compartment corresponds with the volume of the passenger compartment. The equation for determining the resonance frequency of an enclosed space, such as a passenger compartment, is as follows:

$$f_{res} = \frac{c}{2\pi}\sqrt{\frac{A_{orf}}{V_o L'}}$$

In the equation above, "$f_{res}$" the resonance frequency of the compartment, "c" is the speed of sound, "$A_{orf}$" is the area of the orifice, "L'" is the effective length of the orifice, and "$V_o$" is the volume of the cavity. When the shear layer vortices break down at a rate that is equal to the resonance frequency of the passenger compartment, the buffeting condition will be discernible to passengers inside the passenger compartment. The repeated opening and closing of the opening alternately increases and decreases $V_o$ which, in turn, continuously changes $f_{res}$. Because $f_{res}$ is continuously changing, the rate at which the shear layer vortices break down cannot match the resonance frequency of the passenger compartment.

It has been observed that opening and closing the opening at a rate of between one and five cycles per second has been effective to diminish the buffeting condition to a level that is not discernible by a human occupant of the passenger compartment. It has also been observed that varying the rate at which the opening is opened and closed and/or varying the extent to which the blocking member moves can also have an advantageous effect on an effort to diminish the buffeting condition to a level that is not discernible by a human occupant of the passenger compartment.

A further understanding of the above described arrangement and method for reducing the buffeting condition in a passenger compartment of a vehicle may be obtained through a review of the illustrations accompanying this application together with a review of this detailed description.

Figure 1:
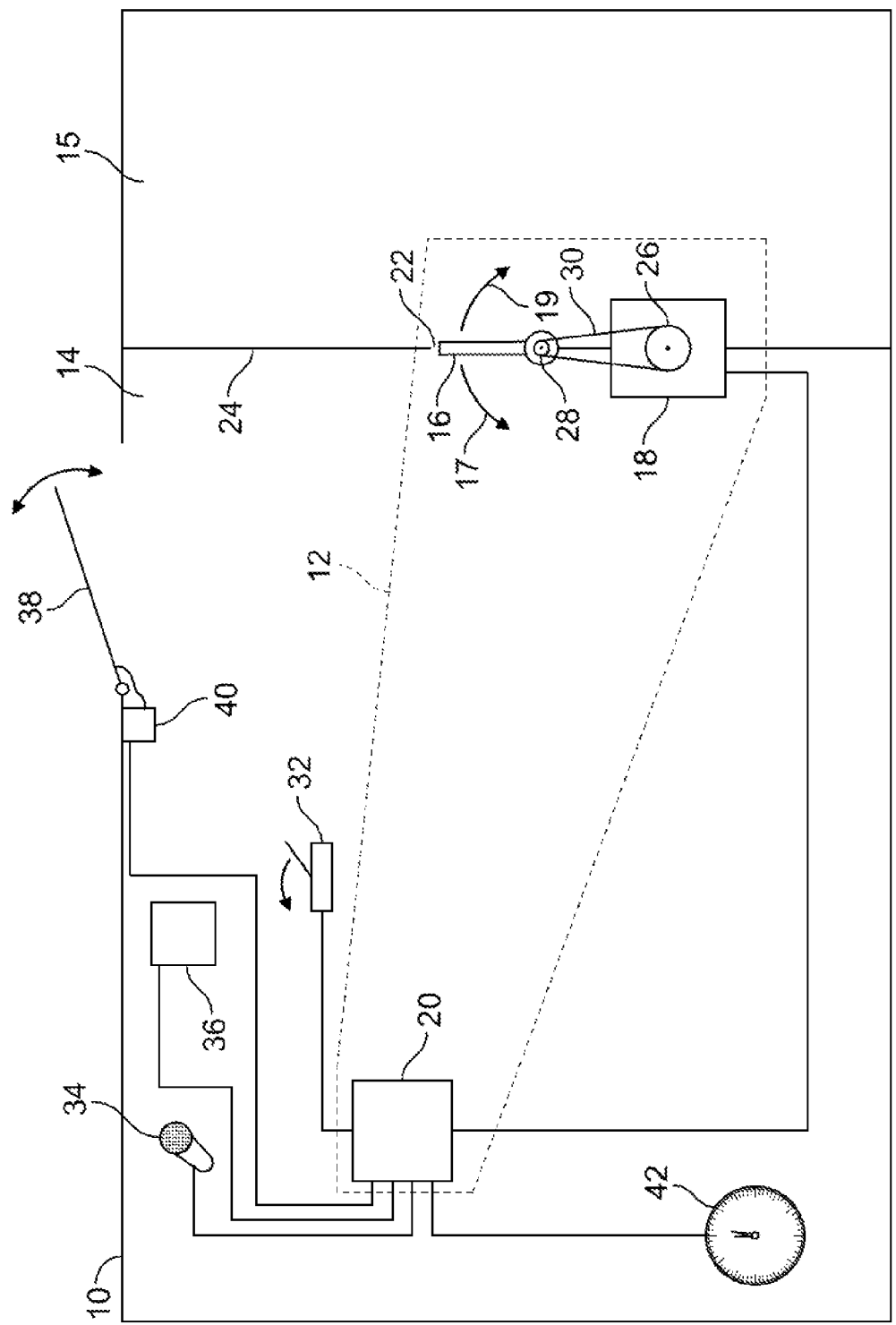
FIG. 1 is a schematic view of a vehicle having a trunk and equipped with the embodiment of a system for reducing a buffeting condition in a passenger compartment.

FIG. 1 is a schematic view of a vehicle 10 equipped with an embodiment of a system 12 for reducing a buffeting condition in a passenger compartment 14. The embodiment of vehicle 10 illustrated in FIG. 1 includes a trunk 15 for the storage of luggage and/or other cargo. Although the context of the discussion herein is with respect to a passenger car, it should be understood that the teachings herein are compatible with all types of automobiles including, but not limited to, sedans, coupes, sport utility vehicles, pickup trucks, minivans, full-size vans, trucks, and buses as well as any other type of automobile having a passenger compartment. Furthermore, the teachings herein are not limited to use only with automobiles but rather, may be used with other types of vehicles as well. For example, the teachings herein may be compatible with vehicles including, but not limited to, aircraft, railway cars, and watercraft. Additionally, the teachings herein may also be compatible in stationary applications such as buildings, residences, and any other structure having a window or other opening.

System 12 includes, but is not limited to, a blocking member 16, a motor 18, and a controller 20. In the illustrated embodiment, blocking member 16 is a planar member that is configured to swivel back and forth in the directions indicated by arrows 17 and 19. In other embodiments, blocking member 16 may be configured to swivel back and forth in only the direction indicated by arrow 17 or only in the direction indicated by arrow 19.

Blocking member 16 is positioned proximate an opening 22 in wall 24 which is disposed between passenger compartment 14 and trunk 15. Blocking member 16 is configured to closes off opening 22 when blocking member 16 is disposed in a closed position (as shown in FIG. 1). When blocking member 16 swivels in the direction of either arrow 17 or arrow 19 towards an open position, opening 22 becomes unobstructed and the volumes of passenger compartment 14 and trunk 15 are placed in fluid communication. This fluid communication impacts the effective volume of passenger compartment 14 and hence the $f_{res}$ of passenger compartment 14. When blocking member 16 swivels the opposite direction back to the closed position, opening 22 becomes obstructed, the volumes of passenger compartment 14 and trunk 15 become separate and distinct, and the $f_{res}$ of the passenger compartment is restored to its original magnitude.

Although blocking member 16 has been depicted here as a swiveling planar member, it should be understood that blocking member 16 may take any other suitable configuration that permits the rapid and repeated opening and closing of opening 22. For example, blocking member 16 may be configured as a sliding door that reciprocates between an extended and retracted position to alternately open and close opening 22. In other configurations, blocking member 16 may comprise a valve. In other embodiments, multiple openings may be defined in wall 24 and a corresponding number of blocking members 16 may be arranged proximate such openings. In still other embodiments, any other configuration that is effective to continuously open and close one or more openings between passenger compartment 14 and trunk 15 may be employed without departing from the teachings of the present disclosure.

Motor 18 is physically connected to blocking member 16 and is configured to move blocking member 16 back and forth between an open position and a closed position. Motor 18 may comprise any suitable motor (e.g., an electric motor) capable of rotational motion, reciprocating motion, a combination of rotational and reciprocating motion, or any other motion that is effective to manipulate blocking member 16 to repeatedly open and close opening 22. In the illustrated embodiment, an output shaft 26 of motor 18 is connected to an input shaft 28 of blocking member 16 via a belt 30 which is configured to transmit torque from output shaft 26 to input shaft 28. It should be understood that this depicted arrangement is exemplary in nature and that any other configuration that is effective to transmit the output of motor 18 to blocking member 16 may also be employed without departing from the teachings of the present disclosure. Furthermore, although motor 18 and blocking member 16 have been depicted as separate components in the illustrated embodiment, it should be understood that in other embodiments, motor 18 and blocking member 16 may be integrated into a single component without departing from the teachings of the present disclosure. Additionally, actuating devices other than motor 18 may also be used without departing from the teaching of the present disclosure. For instance, and without limitation, a pneumatic actuator and/or a hydraulic actuator may alternatively be used.

Controller 20 may be any type of computer, computer system, or microprocessor that is configured to perform algorithms, to execute software applications, to execute sub-routines and/or to be loaded with and to execute any other type of computer program. Controller 20 may comprise a single controller or a plurality of controllers acting in concert. In some embodiments, controller 20 may be dedicated for use exclusively with system 12, while in other embodiments controller 20 may be shared with other systems on board vehicle 10. In still other embodiments, controller 20 may be integrated into a single component with motor 18 and/or blocking member 16.

Controller 20 is configured to actuate motor 18 when a triggering event (discussed below) occurs. Controller 20 may be configured to actuate motor 18 at a predetermined rate. In some embodiments, the predetermined rate may comprise a rate of between one and five cycles per second. In other embodiments, controller may be configured to vary the rate at which motor 18 is actuated. In some embodiments, such variation may be random. In other embodiments, as discussed below, controller 20's variation of the oscillation rate of blocking member 16 may be linked to sensor feedback that permits controller 20 to tune the oscillations of blocking member 16 to achieve an optimal suppression of the buffeting condition.

Controller 20 is operatively coupled to motor 18. Such operative coupling may be implemented through the use of any suitable means of transmission including both wired and wireless connections. For example, motor 18 may be physically connected to controller 20 via a coaxial cable or via any other type of wired connection effective to convey signals. In some embodiments, controller 20 may also deliver electric power to motor 18 by such physical connections while in other embodiments, motor 18 may be separately connected to a separate power source such as a vehicle battery or alternator. In the illustrated embodiment, controller 20 is directly operatively coupled to motor 18. In other embodiments, motor 18 may be operatively coupled to controller 20 across a vehicle bus. In still other motor 18 may be wirelessly operatively coupled to controller 20 via a short-range wireless communication network such as a Bluetooth connection, a WiFi connection or the like.

Being operatively coupled provides a pathway for the transmission of commands, instructions, interrogations and other signals between the controller 20 and motor 18. Through this operative coupling, controller 20 may actuate motor 18 and thereby cause motor 18 to repeatedly move blocking member 16 between an open position and a closed position which, in turn, will diminish the buffeting condition in passenger compartment 14.

As discussed above, controller 20 is configured to actuate motor 18 in response to a triggering event. The triggering event may comprise any of a number of inputs and/or conditions.

In an embodiment, the triggering event may comprise the receipt by system 12 of an input provided by a human occupant of passenger and 14. To facilitate the receipt of such a human input, system 12 may further include a user input device 32 communicatively coupled with controller 20. In the illustrated embodiment, user input device 32 has been depicted as a toggle switch. It should be understood that user input device 32 may take any suitable form that is effective to receive inputs from the human occupant of passenger compartment 14.

A human occupant of passenger compartment 14 may provide an input into user input device 32 any time that the human occupant detects the occurrence of a buffeting condition within passenger compartment 14. In such embodiments, user input device 32 will transmit a signal to controller 20 that corresponds with the input provided by the human occupant. Upon receipt of such a signal, controller 20 may actuate and control motor 18 to oscillate blocking member between the open position and the closed position to diminish the buffeting condition within passenger compartment 14.

In another embodiment, the triggering event may comprise a sound that accompanies the buffeting condition. In such embodiments, system 12 may include a microphone 34 communicatively coupled with controller 20. Microphone 34 may comprise any electronic device that is configured to detect sound energy. Microphone 34 is further configured to generate a signal that corresponds with the sound energy detected and to transmit that signal to controller 20. In such embodiments, controller 20 is further configured to receive the signal from microphone 34, to interpret the signal from microphone 34, and to actuate motor 18 to oscillate blocking member 16 when the signal corresponds with the buffeting condition. In some embodiments, microphone 34 may be dedicated exclusively for use with system 12 while in other embodiments, microphone 34 may be shared with other systems and components onboard vehicle 10.

In another embodiment, the triggering event may comprise the oscillations in ambient pressure which accompany the buffeting condition. In such embodiments, system 12 may include a pressure sensor 36 communicatively coupled with controller 20. Pressure sensor 36 may comprise any electronic device that is configured to detect ambient pressure and/or to detect changes in ambient pressure. Pressure sensor 36 is further configured to generate a signal that corresponds with the ambient pressure and/or the variations in ambient pressure that are detected and to transmit that signal to controller 20. In such embodiments, controller 20 is further configured to receive the signal from pressure sensor 36, to interpret the signal from pressure sensor 36, and to actuate motor 18 to oscillate blocking member 16 when the signal corresponds with the buffeting condition. In some embodiments, pressure sensor 36 may be dedicated exclusively for use with system 12 while in other embodiments, pressure sensor 36 may be shared with other systems and components onboard vehicle 10.

In another embodiment, the triggering event may comprise the opening of a closable opening 38 to passenger compartment 14. Closable opening 38 may comprise a window, a sunroof, a moonroof, or any other occupant-operable opening that provides ventilation to passenger compartment 14. In such embodiments, system 12 may include a sensor 40 that is associated with closable opening 38 and is configured to detect when closable opening 38 is in an opened state. Sensor 40 is communicatively coupled with controller 20 and is configured to generate a signal that is indicative of closable opening 38 being in an open state and further configured to transmit such signal to controller 20. In such embodiments controller 20 is further configured to actuate motor 18 to oscillate blocking member 16 in response to the signal. In some embodiments, Sensor 40 may be dedicated exclusively for use with system 12 while in other embodiments, Sensor 40 may be shared with other systems and components onboard vehicle 10.

In some embodiments, the maintenance of closable opening 38 in an open state will only cause the buffeting condition to occur when the vehicle 10 exceeds a predetermined speed. Therefore, in some embodiments of system 12 which utilize sensor 40 to detect when closable opening 38 is in an open state, a speed sensor 42 may also be included in system 12 and communicatively coupled with controller 20. Speed sensor 42 may comprise a vehicle speedometer, a GPS receiver, or any other device that is configured to detect the speed of vehicle 10. Speed sensor 42 is further configured to generate a signal indicative of the speed of vehicle 10 and to transmit that signal to controller 20. In such embodiments, controller 20 may be configured to actuate motor 18 to oscillate blocking member 16 only when controller 20 receives both the signal from sensor 40 indicating that closable opening 38 is in an open state and the signal from speed sensor 42 indicating that vehicle 10 traveling at, or in excess of, the predetermined speed.

Although user input device 32, microphone 34, pressure sensor 36, Sensor 40, and speed sensor 42 have been discussed above as being utilized in the alternative, it should be understood that system 12 may include more than one of these components. For example, system 12 may include both microphone 34 and pressure sensor 36. The inclusion of multiple components that are capable of triggering the oscillation of blocking member 16 would provide system 12 with a redundancy that would enhance its reliability in combating the buffeting condition.

Additionally, controller 20 may be configured to utilize the signal provided by one or more of the above-described sensors as a means for calibrating the control of motor 18. For example, in an embodiment that utilizes microphone 34, once controller 20 has received the signal from microphone 34 and has actuated motor 18 to begin oscillating blocking member 16, microphone 34 may continue to transmit the signal to controller 20 and controller 20 may use the signal to assess the success of the oscillation of blocking member 16 at combating the buffeting condition. In such embodiments, if the oscillation of blocking member 16 fails to effectively suppress the buffeting condition, controller 20 may be configured to continuously alter the rate of oscillation of blocking member 16 until the buffeting condition is diminished to an acceptable level.

Figure 2:
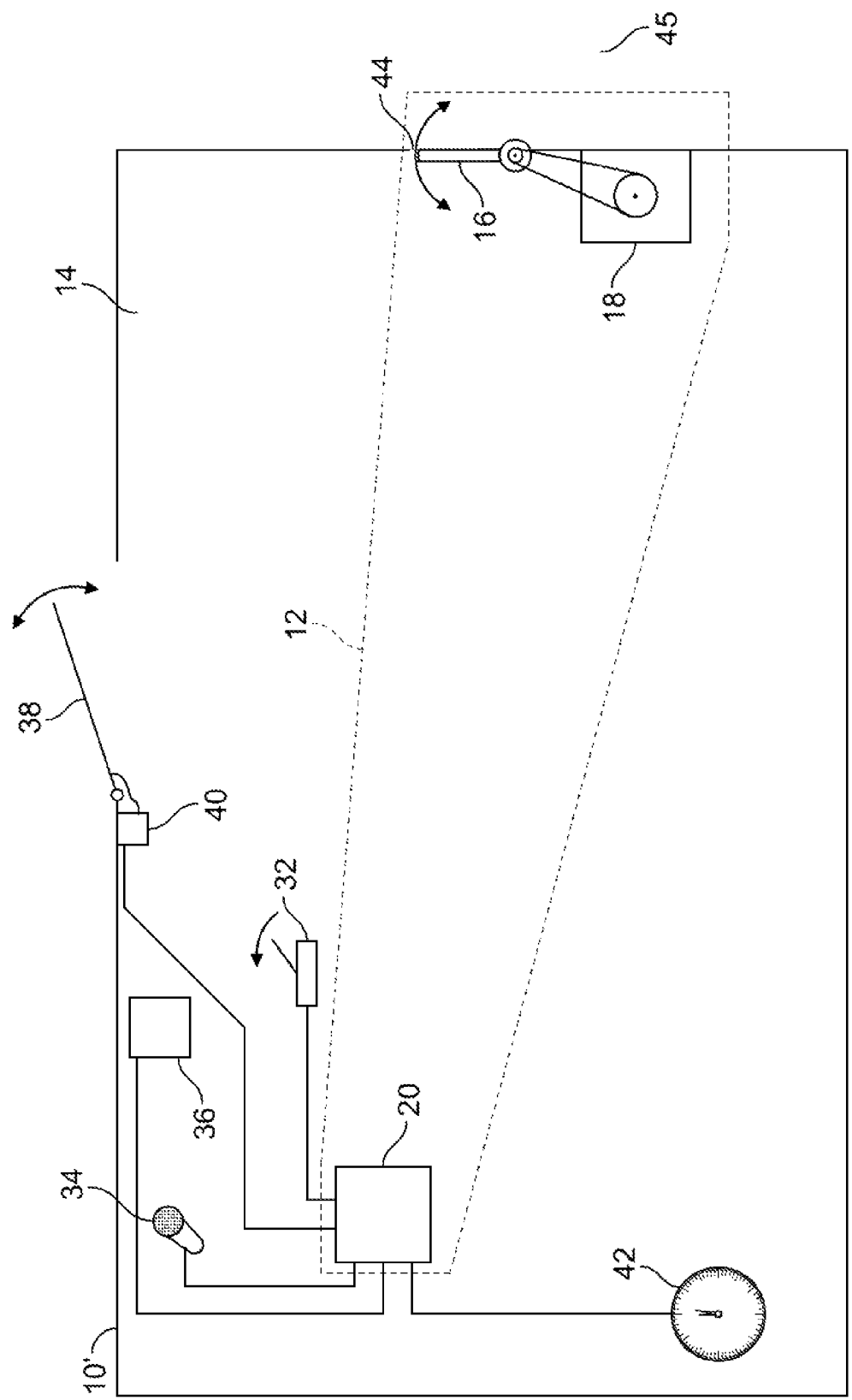
FIG. 2 is a schematic view of a vehicle lacking a trunk and equipped with an embodiment of the system for reducing a buffeting condition in a passenger compartment.

FIG. 2 is a schematic view of a vehicle 10' that lacks a trunk. Such a vehicle may include, for example, a pickup truck, a sport utility vehicle, a hatchback, or the like. As illustrated, vehicle 10' is equipped with system 12, including controller 20, motor 18 and blocking member 16. Additionally, user input device 32, microphone 34, pressure sensor 36, sensor 40, and speed sensor 42 are also depicted and are, as before, compatible for use with system 12. Because vehicle 10 prime lacks a trunk or other suitable compartment adjacent to passenger compartment 14, blocking member 16 is configured to close an opening 44 that exists between passenger compartment 14 and an area 45 outside of vehicle 10'. Thus, when blocking member 16 is in an open position, passenger compartment 14 is in fluid communication with area 45 and thus the volume of passenger compartment 14 is substantially increased. As discussed above, this increase in volume has an impact on the resonance frequency of passenger compartment 14 and the oscillation of closable member 16 between an open position and a closed position will suppress the buffeting condition.

Figure 3:
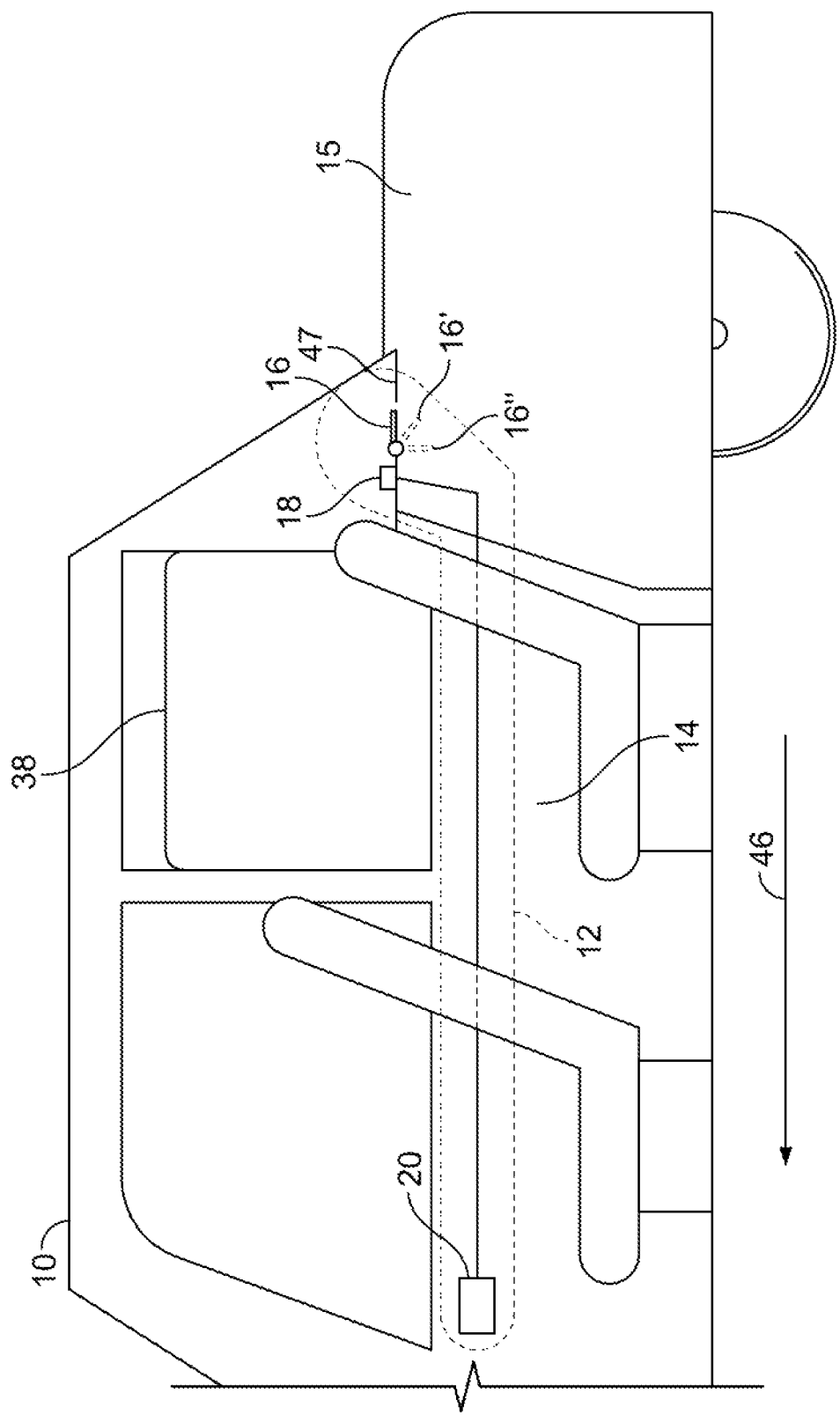
FIG. 3 is a schematic side view illustrating an implementation of the system of FIG. 1.

FIG. 3 is a schematic side view illustrating a mounting configuration for system 12 as it may be implemented in vehicle 10. In the illustrated embodiment, blocking member 16 is positioned to close an opening in a package shelf 47 that separates passenger compartment 14 from trunk 15. As illustrated in FIG. 3, vehicle 10 is being driven in the direction indicated by arrow 46 while closable opening 38 (a rear window) is in a partially lowered state. The open state of closable opening 38 coupled with the movement of vehicle 10 gives rise to the buffeting condition in passenger compartment 14 that system 12 is designed to combat.

When controller 20 receives an appropriate trigger, controller 20 will actuate motor 18 which, in turn, will cause blocking member 16 to oscillate back and forth between an open position and a closed position. In some embodiments, controller 20 may be configured to actuate motor 18 such that blocking member 16 only partially opens (as indicated by blocking member 16' illustrated in Phantom lines) while in other embodiments, controller 20 may be configured to actuate motor 18 such that blocking member 16 opens completely (as indicated by blocking member 16" illustrated in Phantom lines). The opening of blocking member 16 creates a connection between the volume of passenger compartment 14 and the volume of trunk 15 that, for the purposes of calculating the resonance frequency of passenger compartment 14, causes the volume of passenger compartment 14 to substantially increase and thereby changes the resonance frequency of passenger compartment 14.

Figure 4:
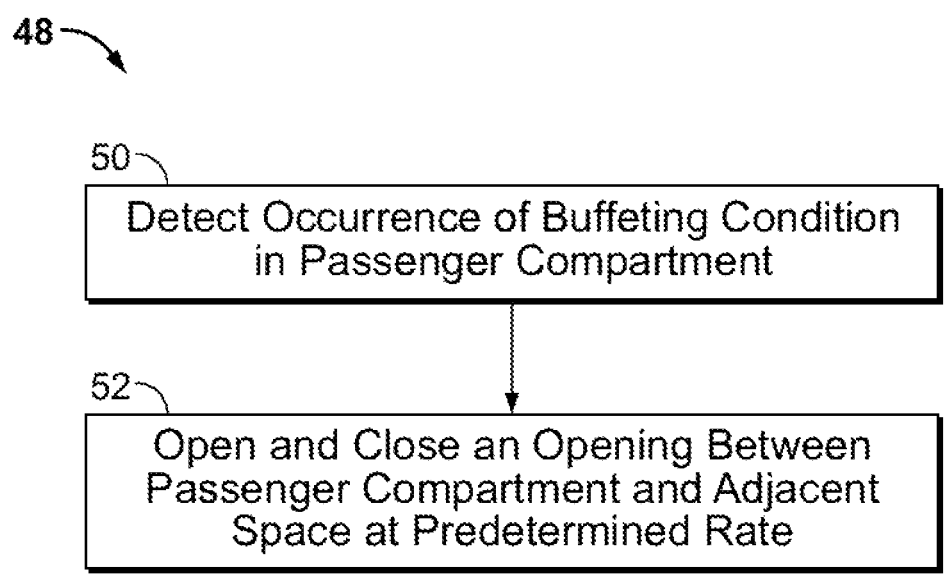
FIG. 4 is a block diagram illustrating a method for reducing a buffeting condition in a passenger compartment of a vehicle.

FIG. 4 is a block diagram illustrating a method 48 for reducing a buffeting condition in a passenger compartment of a vehicle. At block 50, a buffeting condition is detected in a passenger compartment of the vehicle. The buffeting condition may be detected by any suitable means including, but not limited to, detection by a passenger or other occupant of the passenger compartment, detection by a microphone, and detection by a pressure sensor. In other embodiments, this detecting step may comprise the detection of conditions that are suitable for the occurrence of the buffeting condition. For example, a sensor may be used to detect the opening of one or more closable openings of the passenger compartment (e.g., a sensor to detect the opening of a rear window). Additional sensors may also be used to detect additional conditions that further contribute to the creation of the buffeting condition. For example, the vehicle's speedometer, or some other speed sensor, may provide information regarding the speed at which the vehicle is traveling. If the vehicle exceeds a predetermined speed while a closable opening is opened, the confluence of these two conditions may cause the generation of the buffeting condition.

At block 52, after the buffeting condition has been detected, an opening between the passenger compartment where the buffeting condition has been detected and an adjacent space that is separated from the passenger compartment is opened and closed in an oscillating manner. Such oscillations may occur at any appropriate rate. In some embodiments, such oscillations may occur at the rate of between one and five cycles per second, while in other embodiments, the oscillation rates may vary, either randomly or in response to a feedback signal provided by a sensor on the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A system for reducing a buffeting condition in a passenger compartment of a vehicle that arises when a first opening of the vehicle is opened, the system comprising:
    a blocking member disposed between the passenger compartment and an adjacent space, the blocking member configured to move between an open position and a closed position to respectively open and close a second opening between the passenger compartment and the adjacent space;
    a motor operatively coupled with the blocking member and configured to move the blocking member between the open position and the closed position; and
    a controller operatively coupled to the motor, the controller configured to control the motor to move the blocking member such that the blocking member repeatedly alternates between the open position and the closed position at a predetermined rate in response to a triggering event, whereby the buffeting condition experienced in the passenger compartment is diminished.

2. The system of claim 1, further comprising a user input device disposed in the passenger compartment and communicatively coupled with the controller, the user input device configured to detect a user input and to send a signal to the controller when the user input is detected, and wherein the controller is configured to actuate the motor in response to the signal.

3. The system of claim 1, further comprising a microphone disposed in the passenger compartment and communicatively coupled with the controller, the microphone configured to detect a sound in the passenger compartment, to send a signal to the controller when the sound is detected, the signal including information corresponding with the sound, and wherein the controller is configured to actuate the motor when the information corresponds with a buffeting sound.

4. The system of claim 1, further comprising a pressure sensor disposed in the passenger compartment and communicatively coupled with the controller, the pressure sensor configured to detect a variation in ambient pressure in the passenger compartment and to send a signal to the controller when the variation in the ambient pressure is detected, the signal including information corresponding with the variation in the ambient pressure, and wherein the controller is configured to actuate the motor when the information corresponds with the buffeting condition.

5. The system of claim 1, further comprising a window sensor associated with a window in the passenger compartment, the window sensor communicatively coupled with the controller, the window sensor configured to detect when the window is in a lowered position and to send a signal to the controller when the window is in the lowered position, the signal including information corresponding with the lowered position of the window, and wherein the controller is configured to actuate the motor in response to the signal.

6. The system of claim 5, further comprising a speed sensor associated with the vehicle, the speed sensor communicatively coupled with the controller, the speed sensor configured to detect a speed of the vehicle and to send a second signal to the controller including additional information corresponding with the speed of the vehicle, and wherein the controller is configured to actuate the motor when the window is in the lowered position and when the additional information corresponds with a predetermined speed.

7. The system of claim 1, wherein the adjacent space comprises a trunk of the vehicle.

8. The system of claim 7, wherein the blocking member is positioned on a package shelf of the vehicle.

9. The system of claim 1, wherein the adjacent space comprises an area that is external to the vehicle.

10. The system of claim 1, wherein the predetermined rate falls within a range from one cycle per second to five cycles per second.

11. The system of claim 1, wherein the predetermined rate varies during actuation of the motor.

12. The system of claim 11, wherein the predetermined rate varies between one cycle per second and five cycles per second during actuation of the motor.

13. The system of claim 11, wherein the predetermined rate varies in a manner that corresponds with a severity of the buffeting condition.

14. The system of claim 11, wherein the predetermined rate varies randomly.

15. The system of claim 1, wherein the open position comprises a partially open position.

16. A system for reducing a buffeting condition in a passenger compartment of a vehicle that arises when a first opening of the vehicle is opened, the system comprising:
  a blocking member disposed between the passenger compartment and a trunk of the vehicle, the blocking member configured to move between an open position and a closed position to respectively open and close a second opening between the passenger compartment and the trunk;
  a sensor configured to detect the buffeting condition in the passenger compartment of the vehicle and to generate a signal containing information indicative of an occurrence of the buffeting condition when the buffeting condition is detected; and
  a controller communicatively coupled with the sensor and operatively coupled to the blocking member, the controller configured to receive the signal from the sensor and to control the blocking member to move in a manner such that the blocking member repeatedly alternates between the open position and the closed position at a predetermined rate when the signal is received, whereby the buffeting condition experienced in the passenger compartment is diminished.

17. The system of claim 16, wherein the blocking member is disposed on a package shelf of the vehicle.

18. The system of claim 16, wherein the sensor is a microphone configured to detect sound within the passenger compartment.

19. The system of claim 16, wherein the sensor is a pressure sensor configured to detect variations in an ambient pressure within the passenger compartment.

20. A method for reducing a buffeting condition in a passenger compartment of a vehicle that arises when a first opening of the vehicle is opened, the method comprising the steps of:
  detecting an occurrence of the buffeting condition within the passenger compartment of the vehicle; and
  repeatedly opening and closing a blocking member disposed between the passenger compartment and an adjacent space to alternately open and close a second opening at a predetermined rate.

* * * * *